(12) United States Patent
Cheng

(10) Patent No.: US 9,208,085 B2
(45) Date of Patent: Dec. 8, 2015

(54) METHOD AND APPARATUS FOR STORING DATA

(71) Applicant: Huawei Technologies Co., Ltd., Shenzhen, Guangdong (CN)

(72) Inventor: Chuanning Cheng, Guangdong (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 102 days.

(21) Appl. No.: 13/730,705

(22) Filed: Dec. 28, 2012

(65) Prior Publication Data

US 2013/0191595 A1    Jul. 25, 2013

(30) Foreign Application Priority Data

Dec. 30, 2011   (CN) .......................... 2011 1 0456117

(51) Int. Cl.
G06F 12/08    (2006.01)

(52) U.S. Cl.
CPC ......... *G06F 12/0802* (2013.01); *Y02B 60/1225* (2013.01)

(58) Field of Classification Search
CPC ............ G06F 12/0802; G06F 12/0888; G06F 1/3275; G06F 11/3037; Y02B 60/1225; Y02B 60/1235; Y02B 60/1228
See application file for complete search history.

(56) References Cited

U.S. PATENT DOCUMENTS

| 5,394,531 | A  | * | 2/1995  | Smith ........................... 711/136 |
| 6,604,174 | B1 | * | 8/2003  | Dean et al. .................... 711/131 |
| 7,496,715 | B1 | * | 2/2009  | Vartti et al. ................... 711/144 |
| 2003/0156472 | A1 |   | 8/2003  | Satou et al. |
| 2004/0039878 | A1 |   | 2/2004  | van de Waerdt |
| 2005/0144317 | A1 | * | 6/2005  | Chase et al. ................... 709/238 |
| 2007/0180199 | A1 |   | 8/2007  | Augsburg et al. |
| 2007/0233963 | A1 |   | 10/2007 | Yasufuku |
| 2009/0172249 | A1 | * | 7/2009  | Matthews ....................... 711/103 |
| 2009/0172315 | A1 | * | 7/2009  | Iyer et al. ....................... 711/158 |
| 2009/0182836 | A1 | * | 7/2009  | Aviles et al. ................... 709/213 |
| 2010/0017567 | A1 |   | 1/2010  | Fujisawa |
| 2010/0281216 | A1 | * | 11/2010 | Patel et al. ..................... 711/118 |
| 2011/0113199 | A1 | * | 5/2011  | Tang et al. ..................... 711/130 |

FOREIGN PATENT DOCUMENTS

| CN | 1679006 A   | 10/2005 |
| CN | 101375257 A | 2/2009  |

\* cited by examiner

*Primary Examiner* — Yong Choe
*Assistant Examiner* — Francisco Grullon

(57) ABSTRACT

Embodiments of the present invention provide a method and an apparatus for storing data, which relate to the field of data processing. In the present invention, a current device is divided into different load modes in the process of service processing, and manners of storing various data in a Cache are dynamically adjusted, so that nodes with different characteristics in the current device may control operations on the Cache, thus achieving lower power consumption and optimum performance of a large-capacity system under a heavy load.

14 Claims, 7 Drawing Sheets

METHOD AND APPARATUS FOR STORING DATA

CROSS-REFERENCE TO RELATED APPLICATION

This application claims priority to Chinese Patent Application No. 201110456117.7, filed on Dec. 30, 2011, which is hereby incorporated by reference in its entirety.

FIELD OF THE INVENTION

The present invention relates to the field of data processing, and in particular, to a method and an apparatus for storing data.

BACKGROUND OF THE INVENTION

A cache memory (Cache) is a storage unit capable of temporarily storing data transparently, and the access of a processing unit to the cache memory is faster than the access to a lower level storage unit. Operations on the cache memory include operations such as Write Allocate (Write Allocate), Not Write Allocate (Not Write Allocate), Read Allocate (Read Allocate), Not Read Allocate (Not Read Allocate) and Read Invalidate (Read Invalidate).

In writing data into the Cache, if a corresponding write address does not exist in the Cache, a write miss occurs; at this time, a corresponding memory block is loaded in the Cache, and then a cache block is updated, which is the Write Allocate operation.

In writing data into the Cache, if a corresponding write address does not exist in the Cache, a write miss occurs; at this time, data is directly written into a lower level memory and no address is allocated in the Cache, which is the Not Write Allocate operation.

In reading data from the Cache, if a corresponding read address does not exist in the Cache, a read miss occurs; at this time, a corresponding memory block of the lower level memory is loaded in the Cache, and then data is fed back to the processing unit, which is the Read Allocate operation.

In reading data from the Cache, if a corresponding read address does not exist in the Cache, a read miss occurs; data is directly read from the lower level memory and returned to the processing unit, and no address is allocated in the Cache, which is the Not Read Allocate operation.

In the process of reading data, if the data being read is hit in the Cache, after the data is sent to a read operation initiation module, a corresponding CacheLine is set to an invalid state, so that when a new operation is accessed, the CacheLine may be allocated new data and no Cache conflict occurs.

The existing service processing has a fixed feature that use frequencies of different data, such as a packet header, a packet payload and a service processing intermediate variable, are quite different, and the use frequencies of the packet header and the service processing intermediate variable are obviously higher than the use frequency of the packet payload. When processing data, the processing unit, based on this feature, treats the data differently according to a specific rule to place frequently used data in the Cache near the processing unit, so as to increase processing speed and improve system processing performance. In addition, power consumption for accessing the data in the Cache is higher than the power consumption for accessing the data in a lower storage level. Therefore, controlling data access on a storage level closer to the processing unit as much as possible is helpful in both improving the performance and reducing the power consumption.

During the implementation of the present invention, the inventor discovers that the prior art has at least the following problems:

The capacity of the Cache is limited, incapable of storing all the data during processing, so that the data inevitably needs to be stored in the lower level memory, data replacement and interaction constantly occur between the Cache and the lower level memory, and data being processed and frequently used may be replaced into the lower level memory of the Cache by input high traffic data. As a result, the hit rate of the Cache is lowered, the power consumption of a device is increased, and the processing bandwidth of a processing node is affected, so that the system performance is greatly deteriorated with the increase of the processing bandwidth and processing complexity.

SUMMARY OF THE INVENTION

In order to solve the problems existing in the prior art, embodiments of the present invention provide a method and an apparatus for storing data. The technical solutions are as follows:

A method for storing data includes:

judging a load mode of a current device;

when the load mode is a first load mode, storing, in a Cache, all data being processed by the current device;

when the load mode is a second load mode, storing, in the Cache, data being processed by the current device and having a use frequency exceeding a preset frequency, and storing, in a lower level memory of the Cache, data not exceeding the preset frequency; and when the load mode is a third load mode, storing, in the Cache, data being processed by the current device, requiring a processing delay to be within preset time and having a use frequency exceeding the preset frequency.

An apparatus for storing data includes:

a judgment module, configured to judge a load mode of a current device;

a first control module, configured to: when the judgment module obtains, through judgment, that the load mode is a first load mode, store, in a Cache, all data being processed by the current device;

a second control module, configured to: when the judgment module obtains, through judgment, that the load mode is a second load mode, store, in the Cache, data being processed by the current device and having a use frequency exceeding a preset frequency, and store, in a lower level memory of the Cache, data not exceeding the preset frequency; and a third control module, configured to: when the judgment module obtains, through judgment, that the load mode is a third load mode, store, in the Cache, data being processed by the current device, requiring a processing delay to be within preset time and having a use frequency exceeding the preset frequency.

Benefits of the technical solutions provided by the embodiments of the present invention are as follows: a current device is divided into different load modes in the process of service processing, and manners of storing various data in a Cache are dynamically adjusted, so that nodes with different characteristics in the current device may control operations on the Cache, achieving lower power consumption and optimum performance of a large-capacity system under a heavy load.

BRIEF DESCRIPTION OF THE DRAWINGS

To illustrate the technical solutions in the embodiments of the present invention more clearly, the following briefly describes the accompanying drawings for describing the embodiments of the present invention. Apparently, the accompanying drawings in the following description merely show some embodiments of the present invention, and persons skilled in the art may derive other drawings from these accompanying drawings without creative efforts.

DETAILED DESCRIPTION OF THE EMBODIMENTS

To make the objectives, technical solutions, and advantages of the present invention more comprehensible, the following describes the embodiments of the present invention in further detail below with reference to the accompanying drawings.

Embodiment 1

Figure 1:
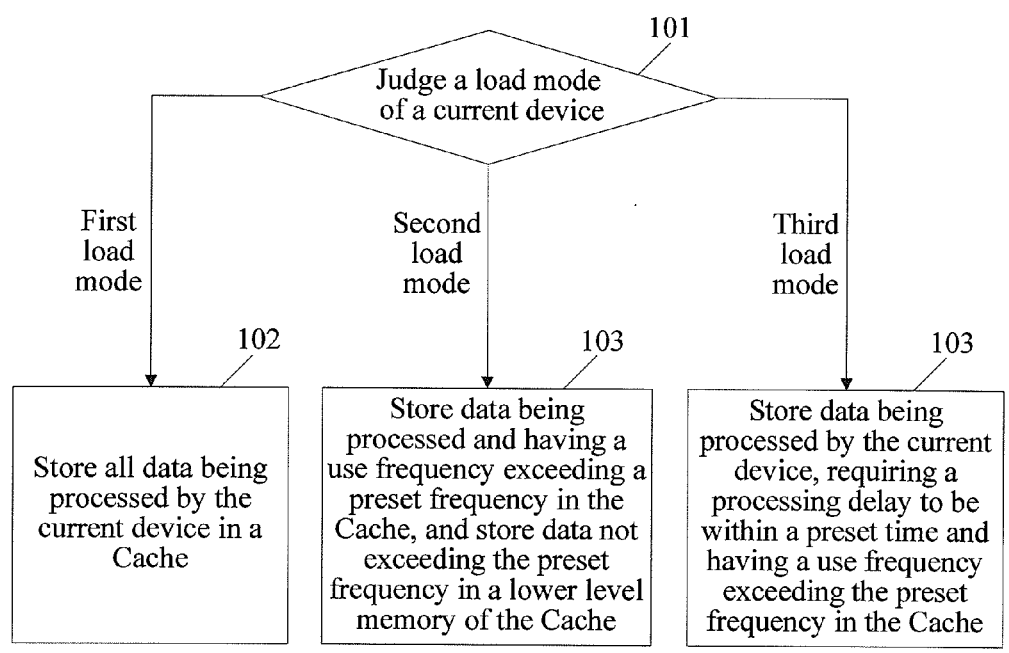
FIG. 1 is a schematic flow chart of a method for storing data provided by Embodiment 1 of the present invention.

As shown in FIG. 1, this embodiment provides a method for storing data, which is applied in a cache memory. The method includes:

101: Judge a load mode of a current device, when the load mode is a first load mode, execute step 102; when the load mode is a second load mode, execute step 103; and when the load mode is a third load mode, execute step 104.

102: Store, in a Cache, all data being processed by the current device.

103: Store, in the Cache, data being processed by the current device and having a use frequency exceeding a preset frequency, and store, in a lower level memory of the Cache, data not exceeding the preset frequency.

104: Store, in the Cache, data being processed by the current device, requiring a processing delay to be within a preset time and having a use frequency exceeding the preset frequency.

A load of the Cache in the second load mode is greater than a load of the Cache in the first load mode, and a load of the Cache in the third load mode is greater than the load of the Cache in the second load mode.

The embodiment of the present invention provides a method for storing data. A current device is divided into different load modes in the process of service processing, and manners of storing various data in a Cache are dynamically adjusted, so that nodes with different characteristics in the current device may control operations on the Cache, thus achieving lower power consumption and optimum performance of a large-capacity system under a heavy load.

Embodiment 2

This embodiment provides a method for storing data, which is improved on the basis of Embodiment 1. In this embodiment, the control on data storage in a Cache of a network data processing device is taken as an example for description. The device includes the Cache and a lower level memory of the Cache. Moreover, the device includes three kinds of nodes: an ingress node (for example, a network port), an egress node (for example, a network port) and multiple processing nodes capable of performing service processing on data (for example, a processor). In this embodiment, the device is set to include the following processing nodes: a processor and an accelerator/coprocessor.

It should be noted that, the Cache is a high-speed small-capacity memory that is in the network processing device and closest to a CPU (Central Processing Unit, central processing unit), and the lower level memory of the Cache, for example, a memory, is the second closest to the CPU.

Figure 2:
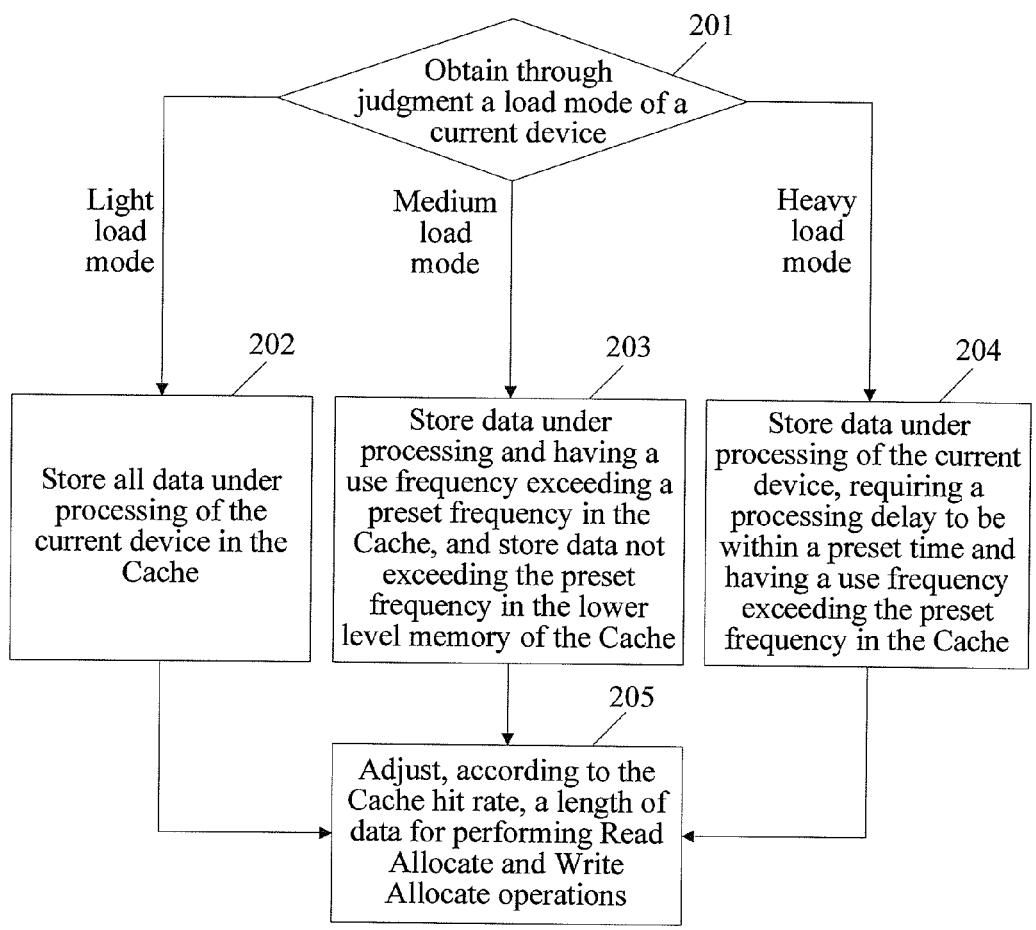
FIG. 2 is a schematic flow chart of a method for storing data provided by Embodiment 2 of the present invention.

As shown in FIG. 2, a method for storing data includes:

201: Obtain, through judgment, a load mode of a current device, when the load mode is a light load mode, execute step 202; when the load mode is a medium load mode, execute step 203; and when the load mode is a heavy load mode, execute step 204.

In the present invention, the device may be divided into multiple load modes in data processing and different control policies may be used in different load modes. In this embodiment, for convenient descriptions, the load mode of a current system is divided into a first, a second and a third load mode, namely, the light load mode, the medium load mode and the heavy load mode.

A load of the Cache in the medium load mode is greater than a load of the Cache in the light load mode, and a load of the Cache in the heavy load mode is greater than the load of the Cache in the medium load mode.

In this embodiment, the load mode of the current system totally includes two manners: the first is a manner of software configuration and the second is a manner of judging through automatic monitoring, where in the first manner of software configuration, the current device provides a user with an interface for presetting the load mode, for example, enables the user to select the load mode through an interface, and the user presets the load mode through software; when traffic of the data processed by the device is steady, the manner may be applied in a small traffic device, and the load mode for presetting is directly delivered to a mode controller of the device; and in the second manner of judging through automatic monitoring, specifically, ingress node actual bandwidth traffic, the number of tasks in a task queue, a capacity of the Cache and a Cache hit rate in the current device are monitored, and the load mode of the current device is obtained through judgment according to the ingress actual bandwidth traffic, the number of the tasks in the task queue, the capacity of the Cache and the Cache hit rate in the current device.

Furthermore, the monitoring the ingress node actual bandwidth traffic, the number of the tasks in the task queue, the capacity of the Cache and the Cache hit rate in the current device and obtaining, through judgment, the load mode of the current device according to the ingress actual bandwidth traffic, the number of the tasks in the task queue, the capacity of the Cache and the Cache hit rate in the current device specifically includes:

201-1: Set up a first monitoring point at an ingress node of the current device, and monitor the first monitoring point in a preset first time period to obtain ingress actual bandwidth traffic R of the current device.

Figure 3:
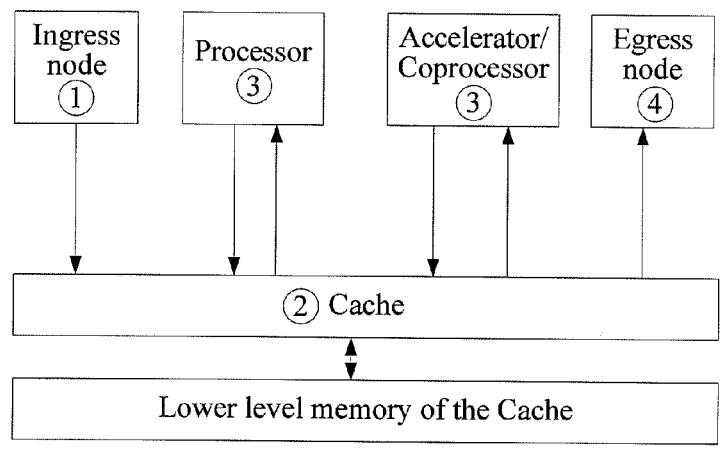
FIG. 3 is a schematic diagram of the situation of setting up multiple monitoring points in a current device to perform monitoring provided by Embodiment 2 of the present invention.

As shown in FIG. 3, in this embodiment, it is necessary to set up multiple monitoring points in the current device to perform monitoring.

Specifically, in step 201-1, as shown by ① in FIG. 3, the first monitoring point is set up at the ingress node, and meanwhile, when the first monitoring point is monitored, a back-pressure signal or a back-pressure message may be obtained through monitoring.

201-2: As shown by ② in FIG. 3, set up a second monitoring point at the Cache of the current device, and monitor the second monitoring point in the preset first time period to obtain the Cache hit rate.

201-3: As shown by ③ in FIG. 3, set up third monitoring points at the processor and the accelerator/coprocessor, and monitor the third monitoring points in the preset first time period to obtain the number of tasks to be processed in the processor and the accelerator/coprocessor.

201-4: As shown by ④ in FIG. 3, set up a fourth monitoring point at an egress node of the current device, and monitor the fourth monitoring point to obtain the number of tasks to be processed at the egress node of the current device.

201-5: Count the number of the tasks in the task queue in the preset first time period.

The number of the tasks in the task queue in the preset first time period is the sum of the numbers of the tasks that are to be processed and are obtained through monitoring at the third monitoring points and the fourth monitoring point.

201-6: Obtain, through calculation according to a method of calculating a data processing delay between any two nodes, a processing delay T for processing data by the current device.

In this embodiment, the method of calculating a data processing delay between any two nodes is as follows:

A: build data with a preset label at a first node and insert time Ta as a time stamp into the data with the preset label;

B: put the data with the preset label and inserted with the time stamp into data being processed by the current device at the first node;

C: perform monitoring at a second node, and when detecting the data with the preset label and inserted with the time stamp, record current time Tb, where the second node includes a next node of the first node or another processing node, and may also be the first node itself; and D: obtain, through calculation, a processing delay Tp=Tb−Ta from the first node to the second node according to the time Ta and the time Tb.

Figure 4:
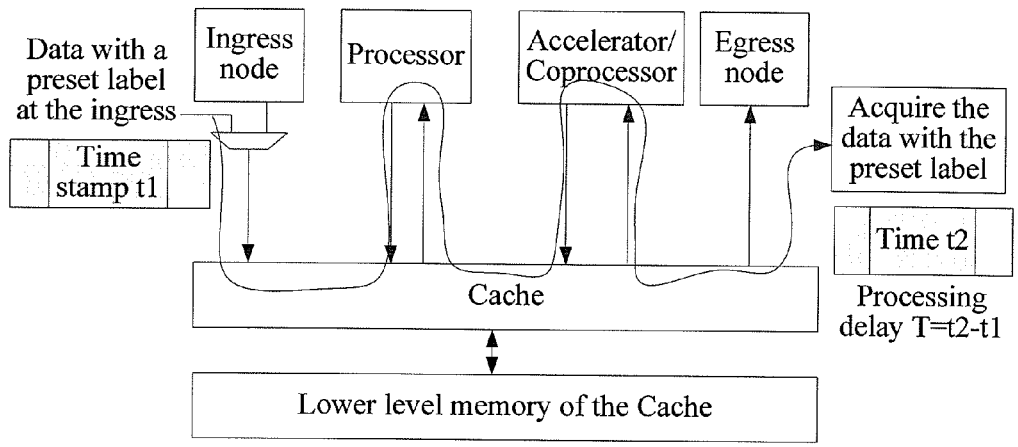
FIG. 4 is a schematic diagram of a transmission route of data with a preset label in the current device provided by Embodiment 2 of the present invention.

It should be noted that, when the processing delay T for processing data by the current device is calculated according to the aforementioned method, specifically, the data processing delay from the ingress node to the egress node is calculated. As specifically shown in FIG. 4, data with a preset label is built at the ingress node, and first time t1 as first time stamp information is inserted into the data with the preset label, data output at the egress node is monitored, and when the data with the preset label is detected, second time t2 of reaching the egress node by the data with the preset label is recorded, and the processing delay T=t2−t1 is obtained through calculation according to the first time t1 and the second time t2, where FIG. 4 shows a transmission route of the data with the preset label in the current device.

201-7: Obtain, through judgment, the load mode of the current device according to the ingress actual bandwidth traffic R, the capacity of the Cache, the Cache hit rate, the processing delay T, the number of the tasks in the task queue and the frequency of receiving the back-pressure signal or the back-pressure message.

In this embodiment, the obtaining, through judgment, the load mode of the current device according to the ingress actual bandwidth traffic R, the Cache hit rate, the processing delay T, the number of the tasks in the task queue and the frequency of receiving the back-pressure signal or the back-pressure message is specifically:

(1) when the ingress actual bandwidth traffic R*the processing delay T≤the capacity of the Cache, the load mode of the current device is the light load mode, where when the load mode is the light load mode, it may be inferred that the amount of the data to be processed in the current device is less than the capacity of the Cache, and the Cache is capable of storing all the data during processing;

(2) when the ingress actual bandwidth traffic R*the processing delay T>the capacity of the Cache and the Cache hit rate remains within the range of a preset first hit rate, the load mode of the current device is the medium load mode, where when the load mode is the medium load mode, the Cache is incapable of temporarily storing all the data during processing, and needs to selectively temporarily store the data; and (3) when any one of conditions that the Cache hit rate is lower than the preset first hit rate, the number of the tasks in the task queue exceeds a preset threshold value, and the number of times of receiving the back-pressure signal or the back-pressure message exceeds a preset number of times is met, the load mode of the current device is the heavy load mode, where when the load mode is the heavy load mode, the current device is under heavy pressure of data processing, the Cache hit rate declines and the performance of the Cache seriously deteriorates.

202: Store, in the Cache, all data being processed by the current device, and execute step 205.

It should be noted that, in the light load mode, the capacity of the Cache is sufficient for storing all data being processed, so when various nodes of the current device perform operations on the Cache, operations on the Cache which is performed by other nodes than the egress node may be set to Read Allocate and Write Allocate, so as to avoid or reduce the power consumption generated in the operation performed on the lower level memory of the Cache.

Figure 5:
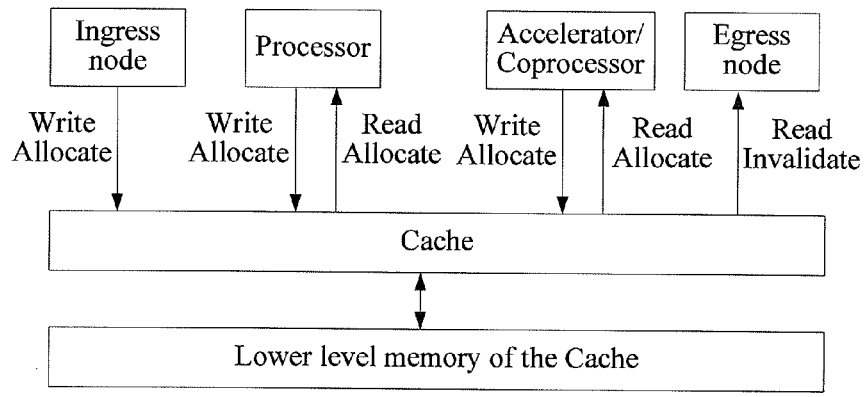
FIG. 5 is a schematic diagram of a configuration manner for controlling, in a light load mode, an operation on the Cache which is performed by the current device provided by Embodiment 2 of the present invention.

As shown in FIG. 5, this embodiment provides a configuration manner for controlling, in the light load mode, an operation on the Cache which is performed by the current device. The operations on the Cache which are performed by the ingress node, the processor and the accelerator/coprocessor are set to Read Allocate and Write Allocate operations, and the operation on the Cache which is performed by the egress node is set to Read Invalidate.

203: Store, in the Cache, data being processed by the current device and having a use frequency exceeding a preset frequency, and store, in the lower level memory of the Cache, data not exceeding the preset frequency, and execute step 205.

It should be noted that, in the medium load mode, the capacity of the Cache is insufficient for storing all the data being processed, and part of processed data inevitably needs to be put in the lower level memory. Therefore, different polices are used for different data, where data having the use frequency exceeding the preset frequency (high-frequency data) is stored in the Cache, and other data (data having the use frequency not exceeding the preset frequency, that is, low-frequency data) is directly put in the lower level memory of the Cache, and no space is allocated in the Cache, avoiding decline in the overall processing performance of the current device and generation of power consumption that are caused by replacing the high-frequency data out of the Cache with the low-frequency data.

For example, in network forwarding service processing, a packet header (Header) may be regarded as high-frequency data, and a packet payload (Payload) may be regarded as low-frequency data. A packet forwarded by network forwarding generally includes a packet header and a packet payload. The packet header is used to indicate the corresponding packet content and communication manner, and therefore has a high use frequency. The part other than the packet header is the packet payload, and for a communication service, the packet payload is only used for forwarding processing, and not for service processing, and therefore has a low use frequency.

In this step, the data being processed by the current device and having the use frequency exceeding the preset frequency is stored in the Cache, the data not exceeding the preset frequency is stored in the lower level memory of the Cache. When an operation is performed, it may be specifically set that for the high-frequency data, the Cache is accessed through Read Allocate and Write Allocate operations, and for the low-frequency data, the Cache is accessed through Not Write Allocate and Not Read Allocate operations.

Figure 6:
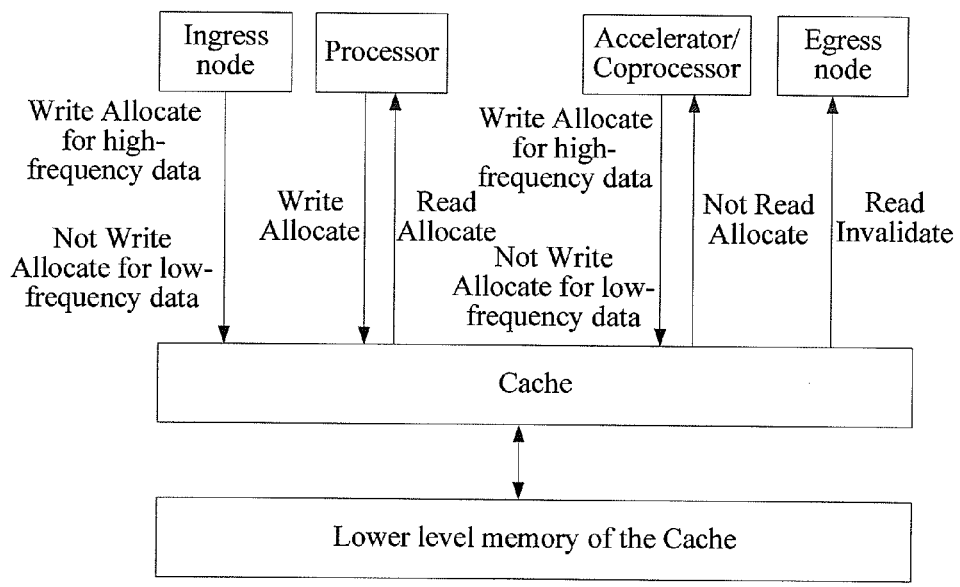
FIG. 6 is a schematic diagram of a configuration manner for controlling, in a medium load mode, an operation on the Cache which is performed by the current device provided by Embodiment 2 of the present invention.

As shown in FIG. 6, the embodiment of the present invention provides a configuration manner for controlling, in the medium load mode, an operation on the Cache which is performed by the current device. The operation on the Cache which is performed by the ingress node is set to the Write Allocate operation for the high-frequency data and the Not Write Allocate operation for the low-frequency data; the operation on the Cache which is performed by the processor is set to the Write Allocate and Read Allocate operations; the operations on the Cache which are performed by the processor and the accelerator/coprocessor are set to the Write Allocate operation for the high-frequency data, the Not Write Allocate operation for the low-frequency data, and the Not Read Allocate operation for both the high-frequency data and the low-frequency data; and the operation on the Cache which is performed by the egress node is set to Read Invalidate.

204: Store, in the Cache, data requiring a processing delay to be within a preset time and having a use frequency exceeding the preset frequency, and execute step 205.

It should be noted that, in this step, the storing, in the Cache, the data requiring the processing delay to be within the preset time and having the use frequency exceeding the preset frequency is specifically that a node sensitive to storage access delay (the node requiring the processing delay to be within the preset time) accesses the Cache through the Read Allocate and Write Allocate operations for the high-frequency data, and other nodes access the Cache through the Not Read Allocate and Not Write Allocate operations.

Furthermore, this step may further include:

controlling traffic of data entering the current device or performing an operation such as safe data discarding at the ingress node, so as to avoid aggravation of deterioration in the performance.

In the heavy load mode, the device is under heavy pressure of service processing, too much data needs to enter the Cache, and data input from the ingress node or operated by an acceleration engine enters the Cache, so that part of the data of the processing node may be replaced into the lower level memory of the Cache, leading to serious decline in the Cache hit rate and decline in chip performance and throughput. Therefore, this step may use two manners to avoid the deterioration in the system performance: 1) nodes insensitive to the Cache access delay, such as the ingress node and the acceleration engine, do not allocate data units in the Cache when a Cache access miss occurs; and 2) discard or back-press a task at the data ingress, so as to avoid aggravation of the situation, where back-pressing the task is specifically stopping the interface of the current device from receiving data, for example, a PCIe interface no longer receives the data sent from an opposite end.

Figure 7:
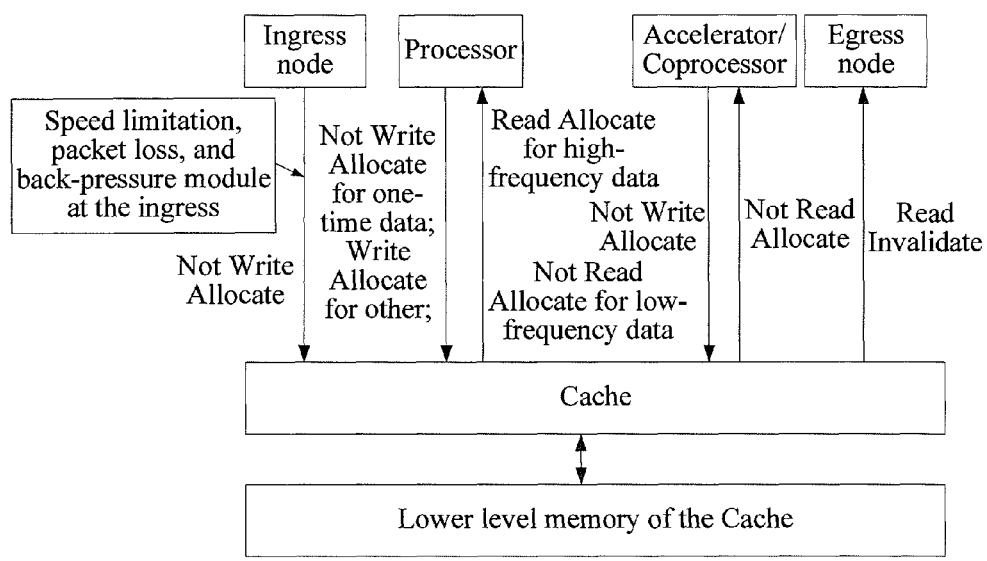
FIG. 7 is a schematic diagram of a configuration manner for controlling, in a heavy load mode, an operation on the Cache which is performed by the current device provided by Embodiment 2 of the present invention.

As shown in FIG. 7, the embodiment of the present invention provides a configuration manner for controlling, in the heavy load mode, an operation on the Cache which is performed by the current device. The operation on the Cache which is performed by the ingress node is set to the Not Write Allocate operation; the operation on the Cache which is performed by the processor is set to the Not Write Allocate for one-time data, the Write Allocate operation for other data, the Write Allocate operation for the high-frequency data and the Not Write Allocate operation for the low-frequency data; the operations on the Cache which are performed by the processor and the accelerator/coprocessor are set to the Not Write Allocate and Not Read Allocate operations; and the operation on the Cache which is performed by the egress node is set to Read Invalidate.

205: Adjust, according to the Cache hit rate, a length of data for performing Read Allocate and Write Allocate operations.

The adjusting, according to the Cache hit rate, the length of the data for performing the Read Allocate and Write Allocate operations specifically includes the following steps:

a. reading the current Cache hit rate;

b. determining whether the current Cache hit rate is all 100% in a preset second time period or exceeds a preset second hit rate, and if the current Cache hit rate is all 100% in the preset second time period or exceeds the preset second hit rate, executing step c; otherwise, executing step d;

c. increasing the length of the data for performing the Read Allocate and Write Allocate operations;

d. determining whether the Cache hit rate is all lower than the preset second hit rate in a preset third time period, and if yes, executing step e; if not, returning to step a; and e. decreasing the length of the data for performing the Read Allocate and Write Allocate operations.

The embodiment of the present invention provides a method for storing data. A current device is divided into different load modes in the process of service processing, and manners of storing various data in a Cache are dynamically adjusted, so that nodes with different characteristics in the current device may control operations on the Cache, thus achieving lower power consumption and optimum performance of a large-capacity system under a heavy load.

Embodiment 3

Figure 8:
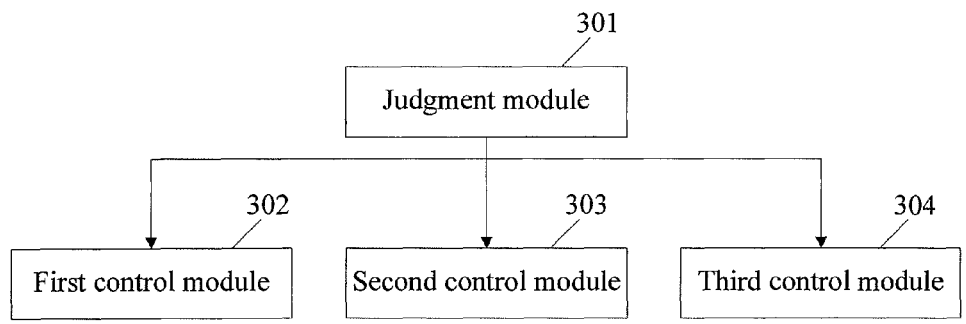
FIG. 8 is a schematic structural diagram of an apparatus for storing data provided by Embodiment 3 of the present invention.

As shown in FIG. 8, the embodiment of the present invention provides an apparatus for storing data. The apparatus includes:

a judgment module 301, configured to judge a load mode of a current device;

a first control module 302, configured to: when the judgment module 301 obtains, through judgment, that the load mode is a first load mode, store all data being processed by the current device in a Cache;

a second control module 303, configured to: when the judgment module 301 obtains, through judgment, that the load mode is a second load mode, store, in the Cache, data being processed by the current device and having a use frequency exceeding a preset frequency, and store, in a lower level memory of the Cache, data not exceeding the preset frequency; and a third control module 304, configured to: when the judgment module 301 obtains, through judgment, that the load mode is a third load mode, store, in the Cache, data being processed by the current device, requiring a processing delay to be within a preset time and having a use frequency exceeding the preset frequency.

Furthermore, the first load mode, the second load mode and the third load mode are specifically a light load mode, a medium load mode and a heavy load mode respectively, and a load of the Cache in the second load mode is greater than a load of the Cache in the first load mode, and a load of the Cache in the third load mode is greater than the load of the Cache in the second load mode.

Furthermore, the judgment module 301 includes a first acquisition unit.

Or, the judgment module 301 includes a first monitoring unit and a first judgment unit.

The first acquisition unit is configured to acquire the load mode, which is preset for the current device by a user through software configuration.

The first monitoring unit is configured to obtain ingress node actual bandwidth traffic R, the number of tasks in a task queue, a processing delay T, a Cache hit rate and the number of times of receiving a back-pressure signal or a back-pressure message in the current device through monitoring.

The first judgment unit is configured to obtain, through judgment, the load mode of the current device according to the ingress node actual bandwidth traffic R, the number of the tasks in the task queue, the processing delay T, the Cache hit rate and the number of times of receiving the back-pressure signal or the back-pressure message in the current device that are obtained by the first monitoring unit through monitoring.

Figure 9:
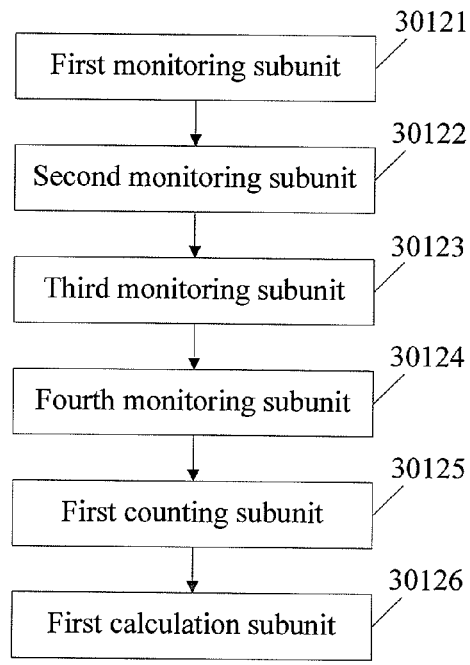
FIG. 9 is a schematic structural diagram of a first monitoring unit in an apparatus for storing data provided by Embodiment 3 of the present invention.

Furthermore, as shown in FIG. 9, the first monitoring unit 3012 includes:

a first monitoring subunit 30121, configured to set up a first monitoring point at an ingress node of the current device, and monitor the first monitoring point in a preset first time period to obtain the ingress actual bandwidth traffic R;

a second monitoring subunit 30122, configured to set up a second monitoring point at the Cache of the current device, and monitor the second monitoring point in the preset first time period to obtain the Cache hit rate;

a third monitoring subunit 30123, configured to set up a third monitoring point at a processing node of the current device, and monitor the third monitoring point in the preset first time period to obtain the number of tasks to be processed in the processing node;

a fourth monitoring subunit 30124, configured to set up a fourth monitoring point at an egress node of the current device, and monitor the fourth monitoring point to obtain the number of tasks to be processed at the egress node;

a first counting subunit 30125, configured to count the number of tasks in the task queue in the preset first time period, where the number of the tasks in the task queue is a sum of the number of the tasks to be processed in the processing node and the number of the tasks to be processed at the egress node; and a first calculation subunit 30126, configured to obtain, through calculation, the processing delay T for processing data by the current device.

The current device at least includes the ingress node, the egress node and the processing node used for performing service processing on the data.

Furthermore, the first calculation subunit 30126 is specifically configured to build data with a preset label at the ingress node, and insert first time t1 as a first time stamp into the data with the preset label, monitor output data at the egress node, and when detecting the data with the preset label and being inserted with the first time stamp, record time, at which the data with the preset label and being inserted with the first time stamp reaches the egress node, as second time t2, and obtain, through calculation, the processing delay T=t2−t1 according to the first time t1 and the second time t2.

Furthermore, the first judgment unit 3013 includes:

a first judgment subunit, configured to: when obtaining, through judgment, that a product of the ingress actual bandwidth traffic R and the processing delay T is less than or equal to a capacity of the Cache, determine that the load mode is the first load mode;

a second judgment subunit, configured to: when obtaining, through judgment, that the product of the ingress actual bandwidth traffic R and the processing delay T is greater than the capacity of the Cache and the Cache hit rate remains within the range of a preset first hit rate, determine that the load mode is the second load mode; and a third judgment subunit, configured to: when obtaining, through judgment, that any one of conditions that the Cache hit rate is lower than the preset first hit rate, the number of the tasks in the task queue exceeds a preset threshold value, and the number of times of receiving the back-pressure signal or the back-pressure message exceeds a preset number of times is met, determine that the load mode is the third load mode.

Figure 10:
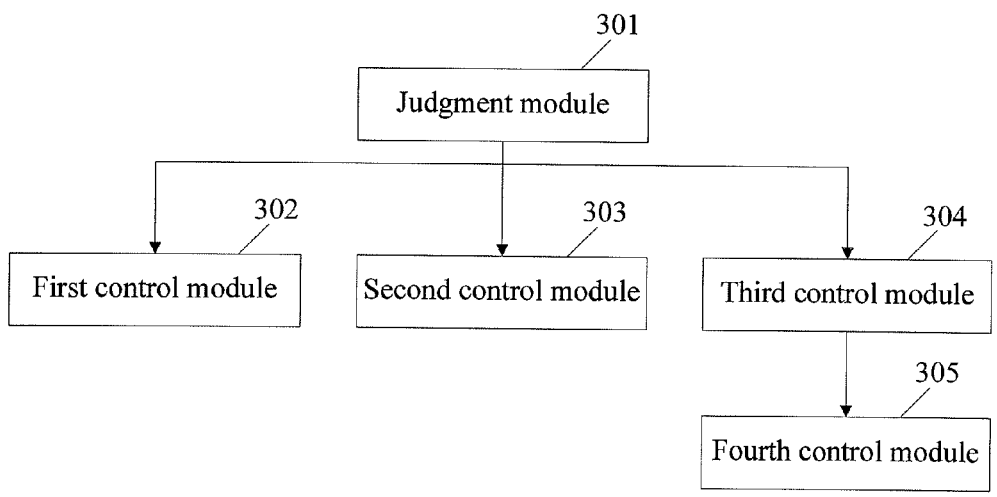
FIG. 10 is a second schematic structural diagram of an apparatus for storing data provided by Embodiment 3 of the present invention.

Furthermore, as shown in FIG. 10, the apparatus further includes:

a fourth control module 305, configured to: when the load mode is the third load mode; control traffic of data entering the current device or perform a data discarding operation at the ingress node of the current device.

Figure 11:
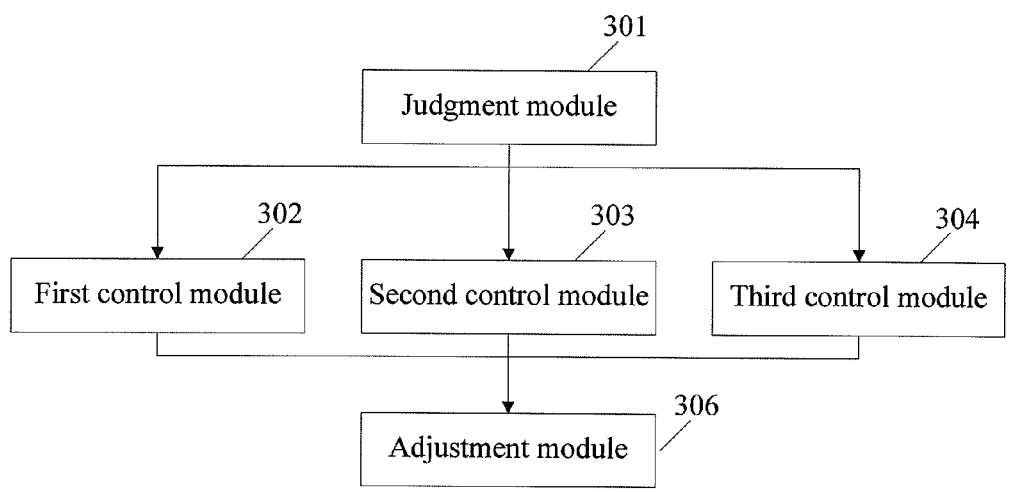
FIG. 11 is a third schematic structural diagram of an apparatus for storing data provided by Embodiment 3 of the present invention.

Furthermore, as shown in FIG. 11, the apparatus further includes:

an adjustment module 306, configured to adjust, according to the Cache hit rate, a length of data for performing Read Allocate and Write Allocate operations on the Cache.

Figure 12:
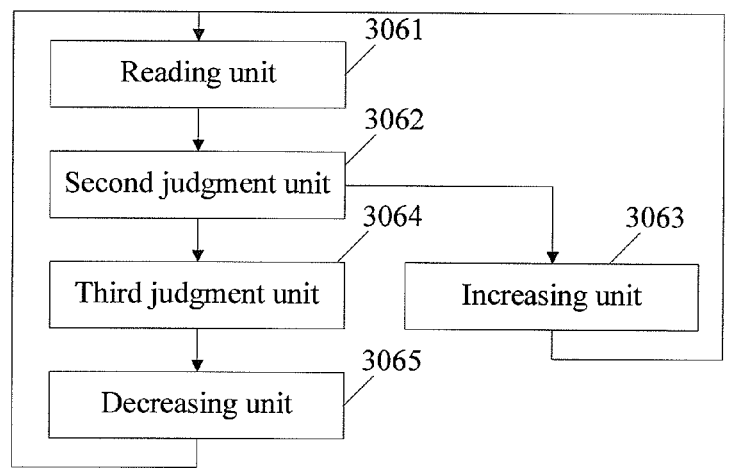
FIG. 12 is a schematic structural diagram of an adjustment module in an apparatus for storing data provided by Embodiment 3 of the present invention.

Furthermore, as shown in FIG. 12, the adjustment module 306 includes:

a reading unit 3061, configured to read the current Cache hit rate;

a second judgment unit 3062, configured to determine whether the current Cache hit rate exceeds a preset second hit rate or is all 100% in a preset second time period;

an increasing unit 3063, configured to: when the second judgment unit 3062 obtains, through judgment, that the current Cache hit rate exceeds the preset second hit rate or is all 100% in the preset second time period, increase the length of the data for performing the Read Allocate and Write Allocate operations on the Cache;

a third judgment unit 3064, configured to: when the second judgment unit 3062 obtains, through judgment, that the current Cache hit rate does not exceed the preset second hit rate or is not all 100% in the preset second time period, determine whether the current Cache hit rate is all lower than the preset second hit rate in a preset third time period; and a decreasing unit 3065, configured to: when the third judgment unit 3064 obtains, through judgment, that the current Cache hit rate is all lower than the preset second hit rate in the preset third time period, decrease the length of the data for performing the Read Allocate and Write Allocate operations on the Cache.

The embodiment of the present invention provides an apparatus for storing data. A current device is divided into different load modes in the process of service processing, and manners of storing various data in a Cache are dynamically adjusted, so that nodes with different characteristics in the current device may control operations on the Cache, thus achieving lower power consumption and optimum performance of a large-capacity system under a heavy load.

Persons skilled in the art should understand that all or a part of the steps of the foregoing embodiments may be implemented through hardware, or may be implemented by a program instructing relevant hardware. The program may be stored in a computer readable storage medium. The storage medium may be a read-only memory, a magnetic disk, or an optical disk.

The above descriptions are merely exemplary embodiments of the present invention, but are not intended to limit the present invention. Any modification, equivalent replacement, or improvement made without departing from the spirit and principle of the present invention should fall within the protection scope of the present invention.

What is claimed is:

1. A method for storing data, the method comprising:
   judging a load mode of a current device;
   when the load mode is a first load mode, storing, in a Cache, all data being processed by the current device;
   when the load mode is a second load mode, storing, in the Cache, data being processed by the current device and having a use frequency exceeding a preset frequency, and storing, in a lower level memory of the Cache, data having a use frequency not exceeding the preset frequency; and
   wherein judging the load mode of the current device comprises:
      obtaining ingress node actual bandwidth traffic R, the number of tasks in a task queue, a processing delay T, a Cache hit rate and the number of times of receiving a back-pressure signal or a back-pressure message in the current device through monitoring, and
      judging the load mode of the current device according to the ingress node actual bandwidth traffic R, the number of tasks in the task queue, the processing delay T, the Cache hit rate and the number of times of receiving the back-pressure signal or the back-pressure message in the current device,
         wherein obtaining the ingress node actual bandwidth traffic R, the number of the tasks in the task queue, the processing delay T, the Cache hit rate and the number of times of receiving the back-pressure signal or the back-pressure message in the current device through monitoring comprises:
            setting up a first monitoring point at an ingress node of the current device, and monitoring the first monitoring point in a preset first time period to obtain the ingress node actual bandwidth traffic R;
            setting up a second monitoring point at the Cache of the current device, and monitoring the second monitoring point in the preset first time period to obtain the Cache hit rate;
            setting up a third monitoring point at a processing node of the current device, and monitoring the third monitoring point in the preset first time period to obtain the number of tasks to be processed in the processing node;
            setting up a fourth monitoring point at an egress node of the current device, and monitoring the fourth monitoring point to obtain the number of tasks to be processed at the egress node;
            counting the number of tasks in the task queue in the preset first time period, wherein the number of the tasks in the task queue is a sum of the number of the tasks to be processed in the processing node and the number of the tasks to be processed at the egress node; and
            obtaining, through calculation, the processing delay T for processing data by the current device, wherein the current device at least comprises the ingress node, the egress node and the processing node configured to perform service processing on the data.

2. The method according to claim 1, wherein the first load mode, the second load mode and a third load mode are specifically a light load mode, a medium load mode and a heavy load mode respectively, and a load of the Cache in the second load mode is greater than a load of the Cache in the first load mode, and a load of the Cache in the third load mode is greater than the load of the Cache in the second load mode.

3. The method according to claim 1, wherein obtaining, through calculation, the processing delay T for processing data by the current device comprises:
   building data with a preset label at the ingress node, and inserting first time t1 as a first time stamp into the data with the preset label;
   monitoring output data at the egress node, and when detecting the data with the preset label and being inserted with the first time stamp, recording time, at which the data with the preset label and being inserted with the first time stamp reaches the egress node, as second time t2; and
   obtaining, through calculation, the processing delay T=t2−t1 according to the first time t1 and the second time t2.

4. The method according to claim 1, wherein when the load mode is a third load mode, the method further comprises:
   controlling traffic of data entering the current device or performing a data discarding operation at an ingress node of the current device.

5. The method according to claim 1, further comprising:
   adjusting, according to a Cache hit rate, a length of data for performing Read Allocate and Write Allocate operations on the Cache.

6. The method according to claim 5, wherein adjusting, according to the Cache hit rate, the length of the data for performing the Read Allocate and Write Allocate operations on the Cache comprises:

reading a current Cache hit rate;
determining whether the current Cache hit rate exceeds a preset second hit rate or is all 100% in a preset second time period;
if the current Cache hit rate exceeds the preset second hit rate or is all 100% in the preset second time period, increasing the length of the data for performing the Read Allocate and Write Allocate operations on the Cache; and
if the current Cache hit rate does not exceed the preset second hit rate or is not all 100% in the preset second time period, determining whether the current Cache hit rate is all lower than the preset second hit rate in a preset third time period, and if the current Cache hit rate is all lower than the preset second hit rate in the preset third time period, decreasing the length of the data for performing the Read Allocate and Write Allocate operations on the Cache.

7. A method for storing data, the method comprising:
judging a load mode of a current device;
when the load mode is a first load mode, storing, in a Cache, all data being processed by the current device;
when the load mode is a second load mode, storing, in the Cache, data being processed by the current device and having a use frequency exceeding a preset frequency, and storing, in a lower level memory of the Cache, data having a use frequency not exceeding the preset frequency; and
wherein judging the load mode of the current device comprises:
  obtaining ingress node actual bandwidth traffic R, the number of tasks in a task queue, a processing delay T, a Cache hit rate and the number of times of receiving a back-pressure signal or a back-pressure message in the current device through monitoring, and
  judging the load mode of the current device according to the ingress node actual bandwidth traffic R, the number of tasks in the task queue, the processing delay T, the Cache hit rate and the number of times of receiving the back-pressure signal or the back-pressure message in the current device,
    wherein judging the load mode of the current device according to the ingress node actual bandwidth traffic R, the number of the tasks in the task queue, the processing delay T, the Cache hit rate and the number of times of receiving the back-pressure signal or the back-pressure message in the current device comprises:
      when judging that a product of the ingress node actual bandwidth traffic R and the processing delay T is less than or equal to a capacity of the Cache, determining that the load mode is the first load mode;
      when judging that the product of the ingress node actual bandwidth traffic R and the processing delay T is greater than the capacity of the Cache and the Cache hit rate remains within a range of a preset first hit rate, determining that the load mode is the second load mode; and
      when judging that any one of conditions that the Cache hit rate is lower than the preset first hit rate, the number of the tasks in the task queue exceeds a preset threshold value, and the number of times of receiving the back-pressure signal or the back-pressure message exceeds a preset number of times is met, determining that the load mode is the third load mode.

8. An apparatus for storing data, the apparatus comprising:
a judgment module, configured to judge a load mode of a current device;
a first control module, configured to: when the judgment module determines that the load mode is a first load mode, store, in a Cache, all data being processed by the current device;
a second control module, configured to: when the judgment module determines that the load mode is a second load mode, store, in the Cache, data being processed by the current device and having a use frequency exceeding a preset frequency, and store, in a lower level memory of the Cache, data having a use frequency not exceeding the preset frequency;
a third control module, configured to: when the judgment module determines that the load mode is a third load mode, store, in the Cache, data being processed by the current device, requiring a processing delay to be within preset time and having a use frequency exceeding the preset frequency; and
wherein the judgment module comprises: a first monitoring unit and a first judgment unit, wherein:
  the first monitoring unit is configured to obtain ingress node actual bandwidth traffic R, the number of tasks in a task queue, a processing delay T, a Cache hit rate and the number of times of receiving a back-pressure signal or a back-pressure message in the current device through monitoring;
  the first judgment unit is configured to judge the load mode of the current device according to the ingress node actual bandwidth traffic R, the number of the tasks in the task queue, the processing delay T, the Cache hit rate and the number of times of receiving the back-pressure signal or the back-pressure message in the current device that are obtained by the first monitoring unit through monitoring; and
  the first monitoring unit comprises:
    a first monitoring subunit, configured to set up a first monitoring point at an ingress node of the current device, and monitor the first monitoring point in a preset first time period to obtain the ingress node actual bandwidth traffic R;
    a second monitoring subunit, configured to set up a second monitoring point at the Cache of the current device, and monitor the second monitoring point in the preset first time period to obtain the Cache hit rate;
    a third monitoring subunit, configured to set up a third monitoring point at a processing node of the current device, and monitor the third monitoring point in the preset first time period to obtain the number of tasks to be processed in the processing node;
    a fourth monitoring subunit, configured to set up a fourth monitoring point at an egress node of the current device, and monitor the fourth monitoring point to obtain the number of tasks to be processed at the egress node;
    a first counting subunit, configured to count the number of tasks in the task queue in the preset first time period, wherein the number of the tasks in the task queue is a sum of the number of the tasks to be processed in the processing node and the number of the tasks to be processed at the egress node; and
    a first calculation subunit, configured to obtain, through calculation, the processing delay T for processing data by the current device, wherein the current device at least comprises the ingress node, the egress node and the processing node configured to perform service processing on the data.

9. The apparatus according to claim 8, wherein the first load mode, the second load mode and the third load mode are specifically a light load mode, a medium load mode and a heavy load mode respectively, and a load of the Cache in the second load mode is greater than a load of the Cache in the first load mode, and a load of the Cache in the third load mode is greater than the load of the Cache in the second load mode.

10. The apparatus according to claim 8, wherein the first calculation subunit is configured to build data with a preset label at the ingress node, and insert first time t1 as a first time stamp into the data with the preset label, monitor output data at the egress node, and when detecting the data with the preset label and being inserted with the first time stamp, record time, at which the data with the preset label and being inserted with the first time stamp reaches the egress node, as second time t2, and obtain, through calculation, the processing delay $T=t2-t1$ according to the first time t1 and the second time t2.

11. The apparatus according to claim 8, further comprising:
a fourth control module, configured to: when the load mode is the third load mode, control traffic of data entering the current device or perform a data discarding operation at an ingress node of the current device.

12. The apparatus according to claim 8, further comprising:
an adjustment module, configured to adjust, according to a Cache hit rate, a length of data for performing Read Allocate and Write Allocate operations on the Cache.

13. The apparatus according to claim 12, wherein the adjustment module comprises:
a reading unit, configured to read a current Cache hit rate;
a second judgment unit, configured to determine whether the current Cache hit rate exceeds a preset second hit rate or is all 100% in a preset second time period;
an increasing unit, configured to: when the second judgment unit determines that the current Cache hit rate exceeds the preset second hit rate or is all 100% in the preset second time period, increase the length of the data for performing the Read Allocate and Write Allocate operations on the Cache;
a third judgment unit, configured to: when the second judgment unit determines that the current Cache hit rate does not exceed the preset second hit rate or is not all 100% in the preset second time period, determine whether the current Cache hit rate is all lower than the preset second hit rate in a preset third time period; and
a decreasing unit, configured to: when the third judgment unit determines that the current Cache hit rate is all lower than the preset second hit rate in the preset third time period, decrease the length of the data for performing the Read Allocate and Write Allocate operations on the Cache.

14. An apparatus for storing data, the apparatus comprising:
a judgment module, configured to judge a load mode of a current device;
a first control module, configured to: when the judgment module determines that the load mode is a first load mode, store, in a Cache, all data being processed by the current device;
a second control module, configured to: when the judgment module determines that the load mode is a second load mode, store, in the Cache, data being processed by the current device and having a use frequency exceeding a preset frequency, and store, in a lower level memory of the Cache, data having a use frequency not exceeding the preset frequency;
a third control module, configured to: when the judgment module determines that the load mode is a third load mode, store, in the Cache, data being processed by the current device, requiring a processing delay to be within preset time and having a use frequency exceeding the preset frequency and
wherein the judgment module comprises: a first monitoring unit and a first judgment unit, wherein:
the first monitoring unit is configured to obtain ingress node actual bandwidth traffic R, the number of tasks in a task queue, a processing delay T, a Cache hit rate and the number of times of receiving a back-pressure signal or a back-pressure message in the current device through monitoring;
the first judgment unit is configured to judge the load mode of the current device according to the ingress node actual bandwidth traffic R, the number of the tasks in the task queue, the processing delay T, the Cache hit rate and the number of times of receiving the back-pressure signal or the back-pressure message in the current device that are obtained by the first monitoring unit through monitoring; and
the first judgment unit comprises:
a first judgment subunit, configured to: when judging that a product of the ingress node actual bandwidth traffic R and the processing delay T is less than or equal to a capacity of the Cache, determine that the load mode is the first load mode;
a second judgment subunit, configured to: when judging that the product of the ingress node actual bandwidth traffic R and the processing delay T is greater than the capacity of the Cache and the Cache hit rate remains within the range of a preset first hit rate, determine that the load mode is the second load mode; and
a third judgment subunit, configured to: when judging that any one of conditions that the Cache hit rate is lower than the preset first hit rate, the number of the tasks in the task queue exceeds a preset threshold value, and the number of times of receiving the back-pressure signal or the back-pressure message exceeds a preset number of times is met, determine that the load mode is the third load mode.

* * * * *